(12) United States Patent
Hildebrand

(10) Patent No.: US 8,870,184 B1
(45) Date of Patent: Oct. 28, 2014

(54) STRATEGY BOARD GAME

(71) Applicant: Kurt Hildebrand, Wimberely, TX (US)

(72) Inventor: Kurt Hildebrand, Wimberely, TX (US)

( * ) Notice: Subject to any disclaimer, the term of this patent is extended or adjusted under 35 U.S.C. 154(b) by 0 days.

(21) Appl. No.: 13/972,402

(22) Filed: Aug. 21, 2013

(51) Int. Cl.
*A63F 3/00* (2006.01)

(52) U.S. Cl.
USPC .......................................... 273/260; 273/288

(58) Field of Classification Search
USPC ................................................ 273/260, 288
See application file for complete search history.

Primary Examiner — Vishu K. Mendiratta
(74) Attorney, Agent, or Firm — Matthew E. Burr

(57) ABSTRACT

A strategy board game of territorial conquest for two to four players. Each player commands an army of twenty-four pieces on a playing board divided into five regions called territories. The pieces rest on the intersections of lines on the board called Points. In each territory there exists a special board Point referred to as a Base. The pieces in the game at all times have a specific direction that they face on the game board. The facing of the piece determines its vulnerability to capture by another piece. In addition to facing, different types of playing pieces are assigned different attributes such as Movement number, Attack number and Blocking faces which affect the utility of each piece in game situations. A notation system allows text play of the game. Electronic embodiments allow game play on electronic devices.

8 Claims, 6 Drawing Sheets

STRATEGY BOARD GAME

CROSS-REFERENCE TO RELATED APPLICATIONS

This application is a divisional application of related co-pending U.S. patent application Ser. No. 13/195,446, filed Aug. 1, 2011, entitled Strategy Board Game by the same inventor, and claims prior the benefit of and priority from said related application, the disclosure of which is incorporated herein by reference.

TECHNICAL FIELD

This disclosure relates generally to board games and more particularly to a strategy board game and apparatus.

BACKGROUND

Strategy board games are a popular genre of board games. The classic strategy board game is chess, but the genre also includes Checkers and Go, for example.

An abstract strategy game is a strategy game aiming to minimize luck without a theme. Some strategy games, however, will have a theme such as territorial conquest. In the strictest sense abstract strategy games conform to the definition of a board or card game in which there is no hidden information, no non-deterministic elements (such as shuffled cards or dice rolls), in which (usually) two players or teams take a finite number of alternating turns. The most enduring of humanity's classic board games, including Checkers, Chess, Go, and Mancala, fit into this category.

Strategic play is sometimes said to resemble a series of puzzles the players pose to each other. At least one commentator has noted the relationship between puzzles and abstract strategy board games in that each board state presents the player with a puzzle to solve: what is the best move? Every such board state/puzzle could, theoretically, be solved using only logic. Accordingly, a strategy game can be thought of as a sequence of puzzles that can each be solved logically. Game play consists of each player posing such a puzzle to the other, iteratively. Good players are the ones who find the most difficult puzzles to present to their opponents.

For purists, an abstract strategy game cannot have random elements or hidden information. In practice, however, many games that do not strictly meet these criteria are commonly classified as abstract strategy games. Games such as Continuo, Octiles, Can't Stop, Sequence, and Mentalis could be considered abstract strategy games, despite having an element of luck or bluffing. A smaller category of non-perfect abstract strategy games manages to incorporate hidden information without using any random elements. The best known example here is Stratego.

It is not unusual for an abstract strategy game to have multiple starting positions. In these types of games, some way to choose which player goes first, such as flipping a coin, for example, may be the only element of chance in the game. That is, the election of which player goes first is determined outside of the game itself. Nevertheless, most people agree that although one of them is starting each game from a different position, the game itself still has no luck element.

SUMMARY

A board game of the present disclosure is a strategy board game of territorial conquest. Two to four players each command an army of twenty-four pieces on a playing board divided into five regions called territories. The pieces rest on the intersections of lines on the board called Points. In each territory there exists a special board Point referred to as a Base. The object of the game is to prevent the opponent (or opponents) from occupying any of the special Base Points on the board.

One of the central strategic elements of the game is the concept of facing. The pieces in the game at all times have a specific direction that they face on the game board. The facing of the piece determines its vulnerability to capture by another piece.

In addition to facing, the different types of playing pieces are assigned different attributes such as Movement number, Attack number and Blocking faces which affect the utility of each piece in game situations.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Figure 1:
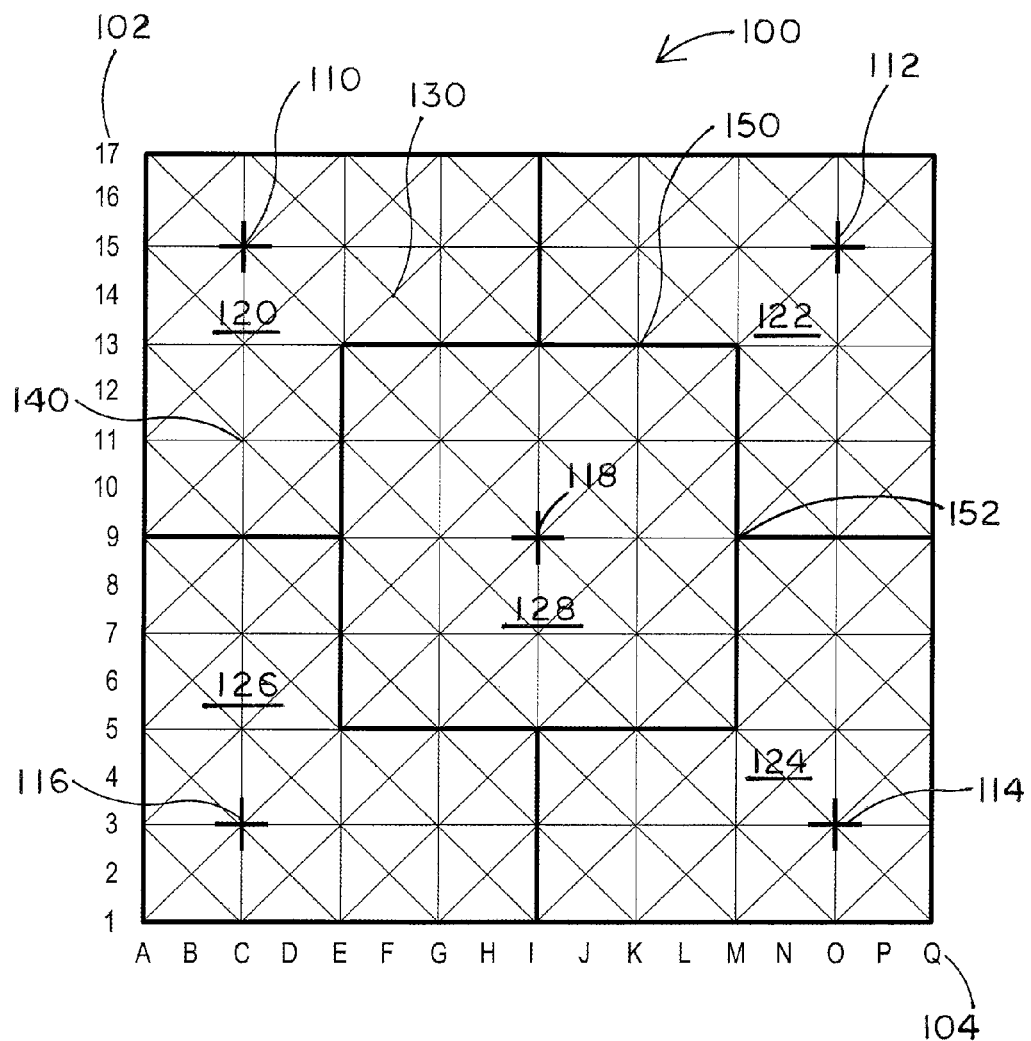
FIG. 1 is a diagrammatic illustration of an exemplary embodiment of a playing grid for a 2 player game of the present disclosure.

In order to explain the game, the playing grid, the pieces and the strategic elements of game play, it will be helpful to define the terminology that will be used herein. These terms will help one understand the features shown in the drawings.

Terminology

Point: Refers to the intersection of four or eight lines on the game board; upon which a piece may rest.

Four-point: Refers to the intersection of four diagonal lines on the game board.

Eight-point: Refers to the intersection of eight lines (four horizontal/vertical and four diagonal) on the game board.

Base: One of five special Points on the game board that is marked with any special symbol such as a darkened or bold plus (+) sign formed by the intersecting lines.

Territory: A defined region on the game board, denoted by darkened or bold lines, shading, coloration, or some other means.

Border-point: Any Point on the board that is part of a line marking the border between two territories.

Move: Refers to one legal movement of a piece on the game board.

Turn: Refers to one player's total number of moves allowed before another player is allowed to move. A player may at times during the game have multiple moves per turn.

Movement number: Refers to the maximum number of Points that a given piece may move (without capturing another piece) during a player's turn.

Attack number: Refers to the maximum number of Points away that a given piece may attack and capture another piece during a player's turn.

Block/Blocking Direction: Refers to any one of the faces on a given piece from which direction that piece cannot be captured by another piece. Markings upon the piece to denote the blocking faces could be made with any convenient symbol such as stylized armor, a stylized brick shape, a solid color, or any other designation intended to aid the memory while playing.

Not block-able: A special property of a specific piece that allows that piece to capture other pieces regardless of their blocking directions.

Turning now to the drawings and referring initially to FIG. 1, FIG. 1 is a diagrammatic illustration of an exemplary embodiment of a playing grid for a 2 player game of the present disclosure. Depending on the specific embodiment of the game, grid 100 may be depicted on a wood or cardboard playing surface, for example, or on plastic or cloth surfaces, which are particularly advantageous for travel versions of the game. Alternatively, grid 100 may be depicted on an electronic screen, including touch screens, for electronic embodiments.

The standard two-player game board is a nine-by-nine grid of lines 100, with each of the 64 resultant squares bisected by forty-five degree diagonal lines. The resulting network consists of 145 intersections—called Points—upon which the game pieces may rest. Preferred embodiments for both the 2 player and 4-player grids provide alphanumeric coordinates along x-axis 102 and the y-axis 104 of the grid 100 layout.

Each territory contains one Base. Pieces may rest on any of the 145 board Points, including the darkened edges of the board and the darkened Border-points between territories. Grid 100 is subdivided by straight lines that intersect at right angles and at 45° degree angles to make Points. Types of Points include Four-points 130 with 4 lines radiating from them, Eight-points 140 with 8 lines radiating from them, Border-points 150, 152, edge points 160 and Bases. Five specific points on the game board are called Bases and marked in this case with a darkened (+). Five regions called Territories are denoted on the board by darkened lines. During game play, the player whose turn it is declares which Territory the piece he or she intends to move is moving from. A piece on a Border-point 150 may be declared to be in either Territory of the border.

A Base is considered to be controlled or owned by a player when that player has a game piece of his or her color resting directly on the Base point (in this case marked with a darkened+). Each player begins the game with the ownership of one Base. A player must own at least one Base to remain in the game. Any player that at the start of his or her turn does not own at least one Base is eliminated from the game. Five Bases 110, 112, 114, 116, 118, are disposed around the grid. Each Base is in one territory and each territory 120, 122, 124, 126, 128 has one Base.

Figure 2:
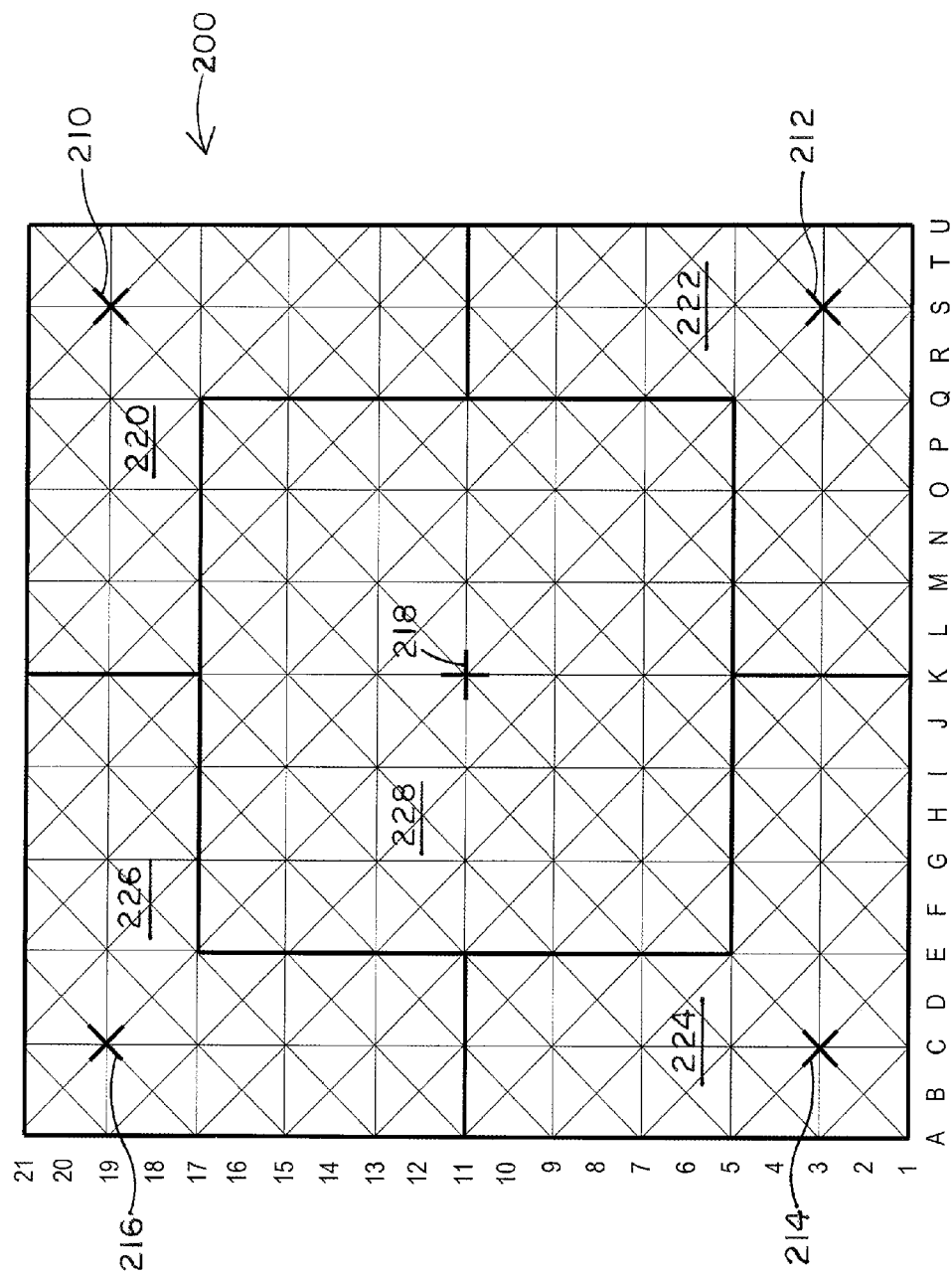
FIG. 2 is a diagrammatic illustration of an exemplary embodiment of a playing grid for a 4 player game of the present disclosure.

FIG. 2 is a diagrammatic illustration of an exemplary embodiment of a playing grid for a 4 player game of the present disclosure. The four-player grid 200 is identical in layout to the two-player grid 100, but is larger in proportion. Instead of based on a nine-by-nine line grid, the four-player board is based on an eleven-by-eleven grid. The four-player board contains a total of 221 points but has the same five Bases 210, 212, 214, 216, 218 and territories 220, 222, 224, 226, 228.

Figure 3A:
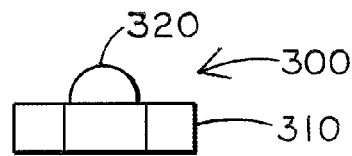
FIG. 3A is a side view schematic illustration of an exemplary embodiment of a Scout piece of a game of the present disclosure.

FIG. 3A is a side view schematic illustration of an exemplary embodiment of a Scout piece of a game of the present disclosure. Typical of a specific embodiment of a game piece, Scout piece 300 has a footer 310, upon which is mounted a figurine 320. To more easily distinguish the types of game pieces, each figurine has a particular distinctive design.

Figure 3B:
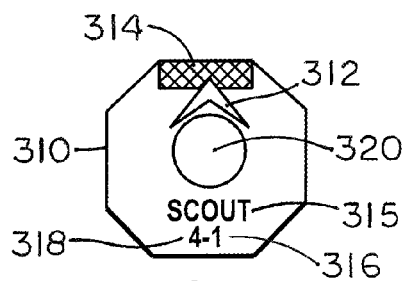
FIG. 3B is top view schematic illustration of the Scout piece of FIG. 3A.

FIG. 3B is top view schematic illustration of the Scout piece of FIG. 3A. Features and attributes of a Scout piece are displayed on the footer 310. Footer 310, like the footers of the other pieces, has an octagonal perimeter shape with 8 sides or "faces." Stylized arrowhead pointer 312 is a directional indicator which indicates the direction in which the piece is facing. The face of piece 300 to which the pointer 312 points is sometimes referred to as the "front" of the piece or "front-facing." As described herein, in specific embodiments, the attributes of the types of pieces are manifest on each piece, usually by printed or electronic display on the footer. Alternative embodiments for experienced players, for example, dispense with the explicit manifestation of the piece attributes because the attributes are implicit in the shape of the figurine.

Stylized blocking brick 314 indicates the face at which an attack by an opposing player's piece is blocked. Piece identifier 315 indicates that the piece is a Scout and therefore has the attributes of a Scout. Among the attributes of a Scout piece is the Movement number 318, which is the number of points it is allowed to move and the Attack number 316, which is the number of points it may move to attack an opponent's piece. In the case of a Scout piece, a Scout may move a maximum of 4 points and may attack an opponent's piece that is 1 point away.

Figure 4A:
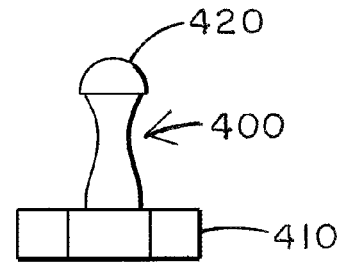
FIG. 4A is a side view schematic illustration of an exemplary embodiment of a Fighter piece of a game of the present disclosure.

FIG. 4A is a side view schematic illustration of an exemplary embodiment of a Fighter piece of a game of the present disclosure. Footer 410 of Fighter 400 has affixed on top of it figurine 420, which has a distinctive shape so that a Fighter piece can be visually distinguished from the other types of pieces.

Figure 4B:
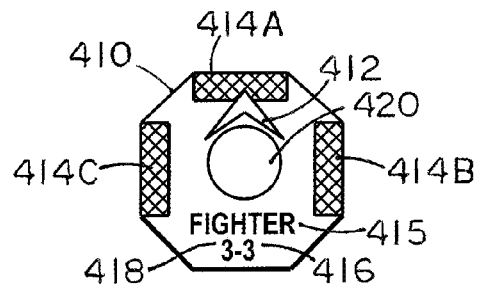
FIG. 4B is top view schematic illustration of the Fighter piece of FIG. 4A.

FIG. 4B is top view schematic illustration of the Fighter piece of FIG. 4A. Directional indicator 412, Piece type indicator 415, and attributes Movement number 418 and Attack number 416 are displayed on footer 410. Among the other attributes of a Fighter 400 are blocking faces 414A, 414B, and 414C, also displayed.

Figure 5A:
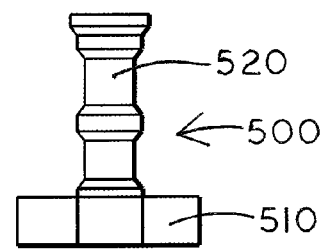
FIG. 5A is a side view schematic illustration of an exemplary embodiment of a Defender piece of a game of the present disclosure.

FIG. 5A is a side view schematic illustration of an exemplary embodiment of a Defender piece of a game of the present disclosure. Footer 510 of Defender 500 has affixed on top of it figurine 420, which has a distinctive shape so that a Defender piece can be visually distinguished from the other types of pieces.

Figure 5B:
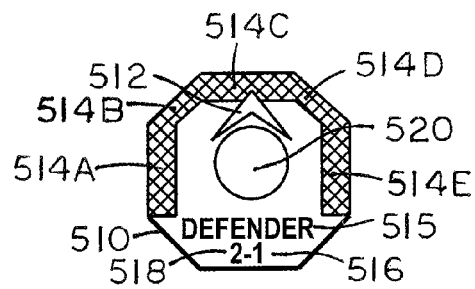
FIG. 5B is top view schematic illustration of the Defender piece of FIG. 5A.

FIG. 5B is top view schematic illustration of the Defender piece of FIG. 5A. Directional indicator 512, Piece type indicator 515, and attributes Movement number 518 and Attack number 516 are displayed on footer 510. Among the other attributes of a Fighter 400 are blocking faces 514A, 514B, 514C, 514D, and 514D, also displayed.

Figure 6A:
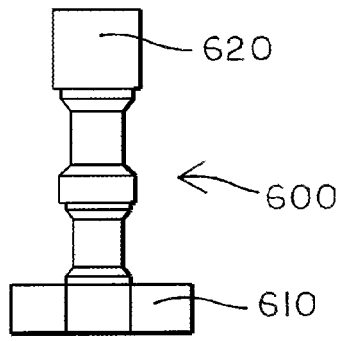
FIG. 6A is a side view schematic illustration of an exemplary embodiment of a Juggernaut piece of a game of the present disclosure.

FIG. 6A is a side view schematic illustration of an exemplary embodiment of a Juggernaut piece of a game of the present disclosure. Footer 610 of Juggernaut 600 has affixed on top of it figurine 620, which has a distinctive shape so that a Juggernaut piece can be visually distinguished from the other types of pieces.

Figure 6B:
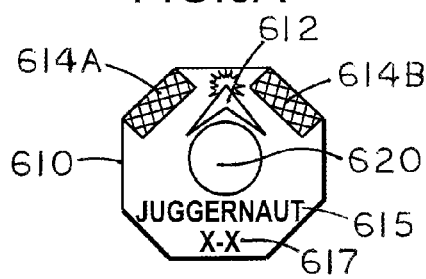
FIG. 6B is top view schematic illustration of the Juggernaut piece of FIG. 6A.

FIG. 6B is top view schematic illustration of the Juggernaut piece of FIG. 6A. Directional indicator 612, piece type indicator 515, and attributes Movement number and Attack number 517 are displayed on footer 510. The Juggernaut piece has unlimited movement and unlimited Attack numbers, indicated by the X-X designation. Among the other attributes of a Juggernaut 600 are blocking faces 614A, and 614B, also displayed.

Figure 7:
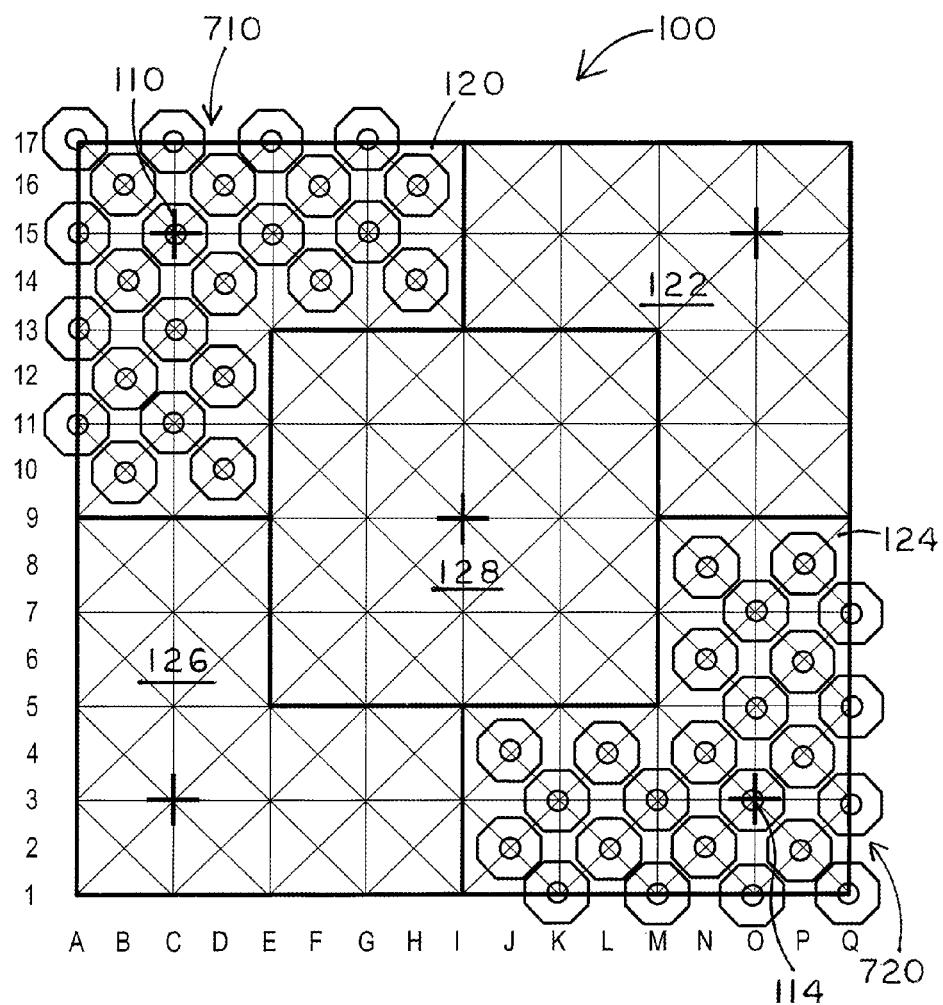
FIG. 7 is a diagrammatic illustration of an exemplary embodiment of a game set up for a 2 person game of the present disclosure.

FIG. 7 is a diagrammatic illustration of an exemplary embodiment of a game set up for a 2 person game of the present disclosure. Game play involves a set of pieces, referred to herein as an army, of one player against an army of pieces of one or more opposing player attempting to eliminate all the Bases of the opposing player(s). Accordingly, preliminary to beginning game play, the pieces of each army are arranged on their assigned starting positions on the grid 100. Each army occupies one Territory and owns one Base. Player 1's army 710 is arranged in Territory 120 and controls Base 110. Player 2's army 720 is arranged in Territory 124 and controls Base 114. The pieces of each army are distinguished from the pieces of other armies by some convenient indicia such as color.

Figure 8:
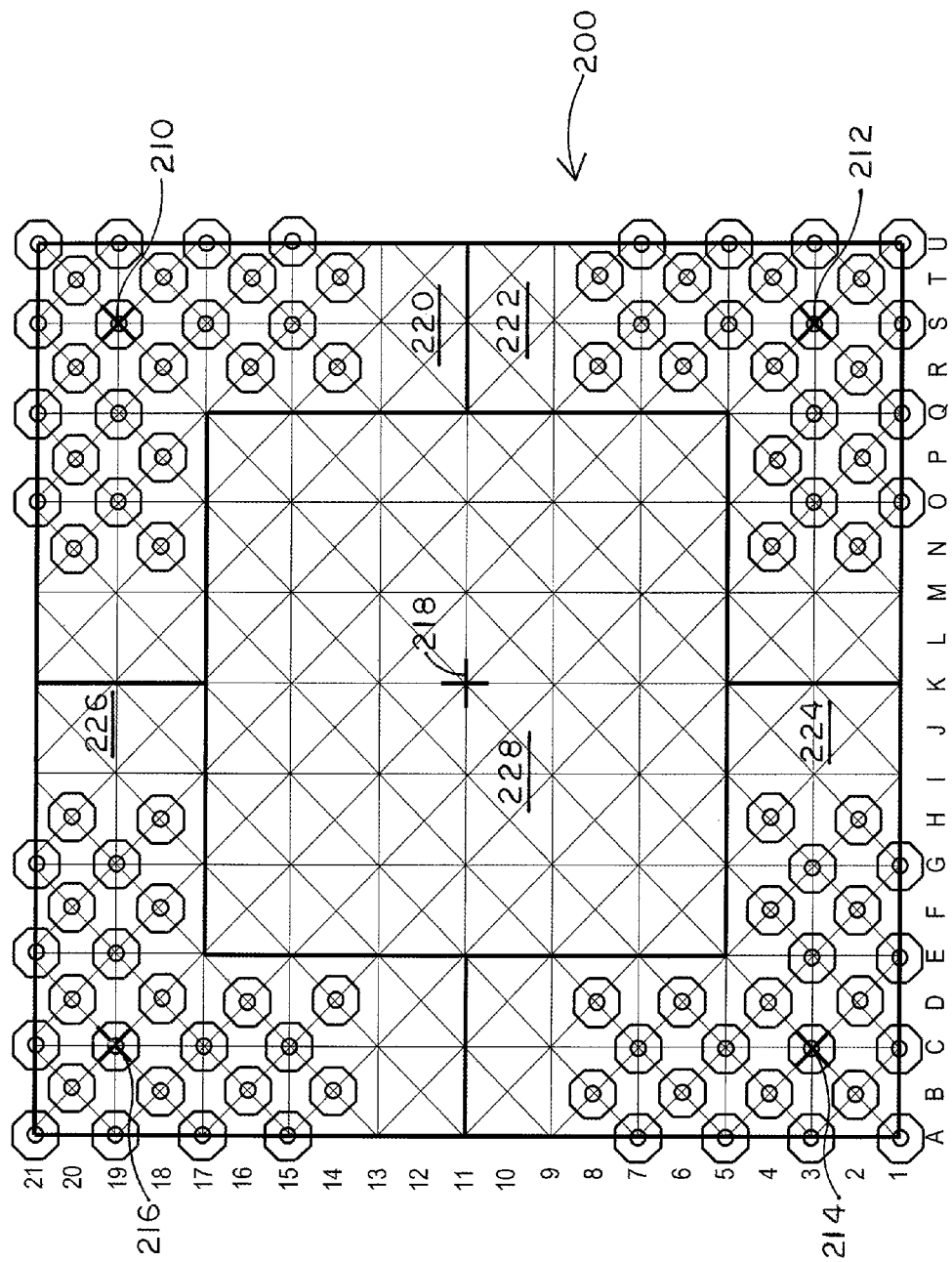
FIG. 8 is a diagrammatic illustration of an exemplary embodiment of a game set up for a 4 person game of the present disclosure.

FIG. 8 is a diagrammatic annotated illustration of an exemplary embodiment of a game set up for a 4 person game of the present disclosure. The armies for player 1 and player 2 are set out as described for the two player game (See FIG. 7). Player 3's army is arranged in Territory 222 and controls Base 212. Player 4's army is arranged in Territory 226 and controls Base 216. In preferred embodiments, Territory 228 is left vacant and Base 218 in Territory 228 is left unoccupied in both the 2 player and 4 player games.

Figure 9:
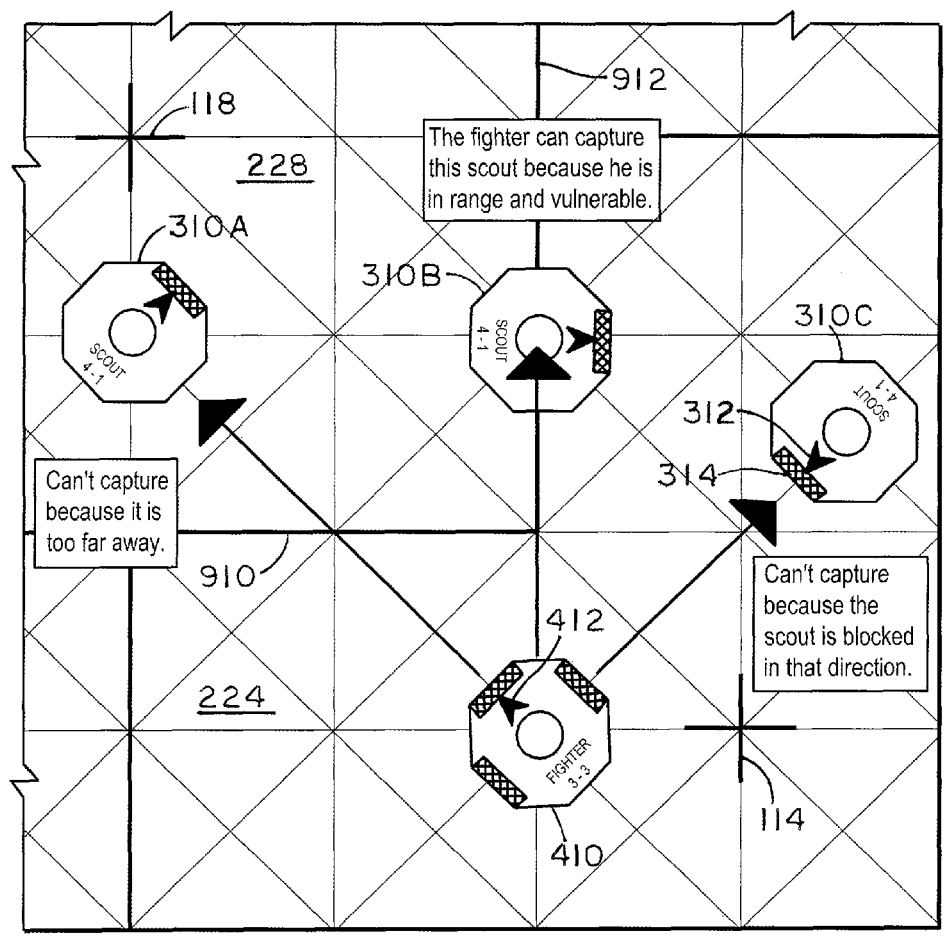
FIG. 9 is a diagrammatic annotated illustration of game piece attributes of an exemplary embodiment of a game of the present disclosure.

FIG. 9 is a diagrammatic annotated illustration of game piece attributes of an exemplary embodiment of a game of the present disclosure. A portion of an exemplary embodiment of a game board of the present disclosure is depicted, with center Base 118 of Territory 228 in the upper left and Base 114 of Territory 224 in the lower right. Border 910/912 is represented by bold lines. Scout game pieces 310A, 310B and 310C are deployed about Points on the board. Fighter piece 410 of an opposing player's army is located on a Point in Territory 224 facing 412 Scout 310A. A Fighter piece has the Movement number attribute of 3 and the Attack number attribute of 3 as well, therefore it can move 3 up to three Points and capture a piece that is up to 3 Points away (counting the Point the captured piece is resting on). Scout 310A is safe from Attack by Fighter 410 because it is more than 3 Points away. Scout 310B, however, can be captured and removed from the board by Fighter 410, so that Fighter 410 occupies the Point presently occupied by Scout 310B, because Scout 310B is within 3 Points of Fighter 410. Although Scout 310C is within 3 Points of Fighter 410, Scout 310C is safe because its face 312 in line with Fighter 410 is a blocking face 314.

It will be understood that the movement and attack attributes of the types of game pieces are displayed on the footer of each piece to assist those who are learning the game and to serve as a convenient reminder to players of the Movement and Attack numbers of each type of piece. However, as players become familiar with the attributes of each type of piece, the display will become less important. Over time, alternative embodiments or versions of the game in which the pieces do not display the attributes will appear because, like chess pieces, players will be so familiar with the attributes that the attributes become second nature. Specific alternative embodiments provide a printed legend of the attributes to which a player can refer in cases where the pieces themselves do not display the attributes. For example, versions of the game provide a printed legend on the game board and other versions provide a legend in a printed instruction booklet of the rules of the game.

Moving Pieces

All pieces move in straight lines from one Point to another Point on the grid. The front facing direction of a piece has no relation to the allowed directions that piece may move—all pieces may move in any direction that is not directly blocked by another piece. All pieces may move up to the allowed maximum Movement number for that piece type, unless directly blocked by another piece.

The moving of pieces changes their facing on the game board. The facing of a piece is determined by the last direction that the piece moved. The arrow (e.g., reference number 312 of FIG. 3) on the game piece (which is to say the front-facing of the game piece) always faces away from the last Point on which the piece was resting.

The Rules of Movement

1. Pieces may move any number of Points up to the maximum for that piece type.

2. Pieces must move in a straight line, with no changing direction mid-move.

3. Pieces may not move through, over, or around other pieces that occupy Points on the line they are traversing.

4. A piece may move between two other pieces, so long as there is a visible line on the board between the starting Point and the ending Point.

5. Pieces may not change facing (rotate in place) without moving.

6. Except for Attack (capturing), pieces may not move to a Point on the board that is already occupied by another piece.

Attacking and Capturing Pieces

Attack is a special type of movement that allows one player to take another Player's piece off the board, by placing one of his or her own pieces on the point that the eliminated piece previously occupied. Attack moves follow all the same rules as Movement moves, with the exception that one piece may occupy the Point upon which a different player's piece currently rests.

The Attack number for the various piece types is different and usually smaller than the Movement number. This means that a piece may move a certain number of Points without capturing a piece, but may only capture a piece by moving within a different maximum number. In addition, one piece may only capture another piece if the line on which the first piece will move is not protected by one of the second piece's blocking directions.

The Rules of Attack

1. Pieces may capture other pieces any number of Points away, up to the maximum Attack number for that piece type.

2. Pieces must Attack in a straight line, with no change of direction mid-move.

3. Pieces may not Attack through, over, or around other pieces that occupy Points on the line they are traversing.

4. A piece may Attack between two other pieces, so long as there is a visible line on the board between the starting point and the ending piece.

5. Pieces may not attack other pieces which have a blocking face in the direction of the attacking piece—except Juggernaut pieces, which ignore all blocking faces when attacking.

The Operations of a Single Turn

1) Player counts his or her Bases to determine how many moves are allowed this turn.
2) Player chooses the first piece to move.
3) Player declares which Territory the piece is moving from, so that all other players may hear.
4) The player moves the first piece.
5) The player repeats the declaration and movement, without moving one piece more than once, and without moving more than one piece per Territory, and without violating any other rules of Movement or Attack, until all allowed moves have been finished.
6) The next player begins at step 1.

Ending the Game

Winning

A player wins the game by being the last player in the game that owns one or more Bases.

Losing

A player loses the game if at the start of his or her turn, the player owns zero Bases. If the player is unable to make a legal move for three consecutive turns, that player loses. If a player moves the same piece between the exact same two Points for three consecutive turns (while the other player(s) are able to make different moves), that player loses.

DRAWING

A draw occurs in the game for the following reasons:
1) All players in the game agree to a draw.
2) All players in the game repeat the exact same move, with the exact same piece, between the exact same two Points on the board, for three consecutive turns.
3) No player in the game is able to make a legal move.

Symbolic Game Notation System

The following system of symbolic coordinate notation (See FIG. 1) may be used to record and replay games. The notation system could also be used to exchange moves in order to play games in real time with or without any game board or set—for example blindfolded games where moves are exchanged verbally, games by postal mail with moves exchanged in writing, games by email, or games played by any other means of relaying text verbally, electronically, or in writing. The following example outlines the general coordinate notation system, symbolic conventions, and examples of usage. The same system and conventions apply for both 2-player and 4-player games.

Notation System Symbols and Conventions

| Symbol | Meaning | Example |
|---|---|---|
| S | Scout | S (a1)-(b2) |
| F | Fighter | F (a1)-(b2) |
| D | Defender | D (a1)-(b2) |
| J | Juggernaut | J (a1)-(b2) |
| - | Move (Moves) | S (a1)-(b2) |
| x | Capture (Captures) | S (a1)x(b2) |
| (xy) | Board coordinates | S (a1)-(b2) |
| [+] | Bases now under control. This notation is used at the end of a player's turn in which the number of controlled Bases changed, or at the very start of a player's turn follow the loss (capture by an opponent) of one or more Bases. Note the symbol + means Base not plus. | (the end of a turn during which the player occupied a new Base) S (a1)-(c3) [2+] (the beginning of a turn after which an opponent deprived this player of a Base) [1+] S (a1)-(b2) |
| $ | In other words [2+] means "two Bases under control" not "two additional Bases". Denotes new piece added to the board and the facing of that new piece. Add one line to the game record for the player's turn, at the end of the turn, for each new piece added to the board. The facing coordinate is the most immediate adjacent Point to the new piece that the piece is facing. | S (b2)x(c3) [+2] $F (b4) = (c5) $S (c1) = (e1) $S (a3) = (a5) In the example the player captured a Base at (c3), eliminated another player, and chose to restore a Fighter to (b4) and Scouts to (c1) and (a3). The new Fighter faces toward c5, the new Scouts face toward e1 and a5 respectively. |
| [0+] | Simply means the player has been eliminated and loses the game. Use this notation as the final "move" in the column of the losing player. | [0+] |

Sample Game Record Demonstrating Notation System

The following game record shows 5 turns of an example game between two players. For four player games, an additional column is added for each additional player.

| Turn | Player 1 | Player 2 | Explanation |
|---|---|---|---|
| 1. | S (o7)-(o15) [2+] | F (a11)-(a5) | Player 1 moves a scout from o7 to o15. Player 1 player now controls two bases. Player 2 moves a fighter from a11 to a5. |
| 2. | S (k3)-(e3) S (o15)-(p16) [1+] | S (c11)-(c3) [2+] | Player 1 moves a scout from k3 to e3 and another scout from o15 to p16. Player 1 has (by necessity) moved off a base and so now controls only one base. Player 2 moves a scout from c11 to c3. Player 2 player now controls two bases. |
| 3. | F (o5)-(i5) | F (a5)-(a1) S (d14)-h(10) | Player 1 moves a fighter from o5 to i5. Player 2 moves a fighter from a5 to a1 and a scout from d14 to h10. |
| 4. | F (q7)-(k7) | S (f14)-(i11) F (a1)-(b2) | Player 1 moves a fighter from q7 to k7. Player 2 moves a scout from f14 to i11 and a fighter from a1 to b2. |
| 5. | F (m3)-(i3) | F (c13)-(c9) S (h10)-(j8) | Player 1 moves a fighter from m3 to i3. Player 2 moves a fighter from c13 to c9 and a scout from h10 to j8. |

The game is described herein without concern for the medium in which the components of the game are manifest. Specific embodiments provide a physical playing grid with tangible playing pieces. Alternative embodiments are adapted for play with an electronic device and provide a virtual playing environment wherein a virtual playing grid and virtual pieces are displayed electronically on a screen. A user interface may be provided for game play. Examples of suitable user interfaces for electronic embodiments include but are not limited to interactive touch screens, keyboards, computer mice, virtual keyboards, voice recognition technologies and so forth.

Accordingly, for adaptation of the game to electronic embodiments, the present disclosure provides programs stored on machine readable media to operate computers and electronic devices according to the principles of the present disclosure to encode the rules of the game and to display the board and pieces. Machine readable media include, but are not limited to, magnetic storage medium (e.g., hard disk drives, floppy disks, tape, etc.), optical storage (CD-ROMs, optical disks, etc.), and volatile and non-volatile memory devices (e.g., EEPROMs, ROMs, PROMs, RAMs, DRAMs, SRAMs, firmware, programmable logic, thumb drives, downloadable files, etc.). Furthermore, machine readable media include transmission media (network transmission line, wireless transmission media, signals propagating through space, radio waves, infrared signals, etc.) and server memories. Moreover, machine readable media includes many other types of memory too numerous for practical listing herein, existing and future types of media incorporating similar functionally as incorporate in the foregoing exemplary types of machine readable media, and any combinations thereof. The programs and applications stored on the machine readable media in turn include one or more machine executable instructions which are read by the various devices and executed. Each of these instructions causes the executing device to perform the functions coded or otherwise documented in it. Of course, the programs can take many different forms such as applications, for certain mobile devices applications that are known colloquially as "apps," operating systems, Perl scripts, JAVA applets, C programs, compile-able (or compiled) programs, interpretable (or interpreted) programs, natural language programs, assembly language programs, higher order programs, embedded programs, and many other existing and future forms which provide similar functionality as the foregoing examples, and any combinations thereof.

Many modifications and other embodiments of the game, pieces, and playing apparatus described herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for playing a strategy desktop game for two or four players whereby the desktop game is transformed by a machine into an electronic game, the method comprising the steps of:
   a. providing an electronic memory and an electronic display;
   b. providing an electronic medium having a programmable microprocessor connected to the electronic display and in communication with the electronic memory, the microprocessor programmed to cause the display of a playing field divided by lines into a plurality of square sections arranged into a grid with coordinates, each section having a center and being diagonally subdivided by diagonal lines that intersect at the center whereby the intersection of lines defines a point, and further wherein subsets of adjacent sections are demarked to define a plurality of territories each territory having a boundary perimeter that encompasses a base point inside the territory; at least two sets of virtual playing pieces, each one of the pieces having eight faces arranged in an octagon wherein one face is designated the front face and movement on the grid is permitted only in the direction of the front face; wherein the pieces of each set are subdivided into a plurality of types, each type defined by:
      (iv) a maximum number of points the piece is allowed to move without attacking an opponent's piece,
      (v) a maximum number of points the piece is allowed to move to attack an opponent's piece, and
      (vi) one or more attack blocking faces upon which the piece cannot be attacked by an opponent;
   the microprocessor further causing the display of an identifier for each set of pieces, to identify the pieces of the set as belonging to a particular player;
   the microprocessor further being programmed to cause the display of an arrangement of one set of pieces in a first territory having a first base point and at least one other set of pieces in a second territory having a second base point; and
   c. providing a player interface for moving pieces in alternating player turns along the grid until all players but one are eliminated by loss of base points.

2. The method of claim 1, further comprising providing a notation system to play the game and wherein the method is executed using the notation system.

3. The method of claim 1 wherein the game is played with two players.

4. The method of claim 1 wherein the game is played with four players.

5. The method of claim 1, wherein the types of virtual pieces comprise:
   a. scout pieces having a single attack blocking face,
   b. fighter pieces having 3 attack blocking faces,
   c. defender pieces having five attack blocking faces, and
   d. juggernaut pieces having two attack blocking faces.

6. The method of claim 5, wherein the two or more attacking faces of the defender virtual pieces are adjacent to each other.

7. The method of claim 5, wherein the attack blocking faces of the fighter virtual pieces are non-adjacent.

8. The method of claim 1, wherein the player interface comprises a touch screen.

* * * * *